United States Patent Office 2,822,352
Patented Feb. 4, 1958

2,822,352

CHLOROPRENE ADHESIVE CURED WITH CARBON DISULFIDE-ALKYL AMINO-ALCOHOL REACTION PRODUCT

William E. Tann, Akron, Ohio, assignor to The Firestone Tire & Rubber Company, Akron, Ohio, a corporation of Ohio No Drawing. Application April 23, 1953
Serial No. 350,753

15 Claims. (Cl. 260—79.5)

This invention relates to improved neoprene (rubbery chloroprene polymer) cements and more particularly to vulcanizable neoprene cements containing a combination of stabilizing agents and vulcanization accelerators as specified herein. The term "cements" as used in this specification include coatings, paints and adhesives wherein a chloroprene polymer is dissolved or dispersed in a non-aqueous solvent.

Neoprene air-curing cements until the present invention, underwent great increase in viscosity to attain a gelled state during storage before use. This gelled state was due to cross linking produced by curing agents, polymerization oxidation or by mechanism not completely understood. In any event such a gelled state renders the neoprene cement entirely useless for bonding surfaces. Gelling of neoprene cement during storage has been avoided before the present invention by manufacturing the cement in two parts and storing each part separately. A nonvulcanizing solvent base cement portion was formed of neoprene and modifying ingredients such as zinc oxide and carbon black dispersed in a solvent but without a vulcanization accelerator. The base cement portion and the accelerator portion were stored separately until ultimate use. Whereupon the base cement and the accelerator portion were mixed and the resulting vulcanizable cement was applied immediately to surfaces to be bonded. Such two-part cement is cumbersome to store, ship and use. Moreover such cement is unsatisfactory particularly because in the event that all of the vulcanizable adhesive is not used immediately after the accelerator is added the portion not so used will gell and thus become unusable.

A proposal has been made to reduce the gelling tendency of neoprene cements by reducing the amount of vulcanization accelerator used therein. In order to form a satisfactory bond between two cemented surfaces it is necessary to vulcanize the cement; however, the use of a less quantity of accelerator requires that the step of vulcanizing the cement be increased an undersirable length of time. Moreover, a reduction of the amount of accelerator in a cement reduces the strength of the vulcanized bond formed by such a cement.

The most successful of the prior art neoprene cements to resist gelling is compounded with a vulcanization accelerator combination of dibenzylamine and carbon disulfide. This cement, although having some resistance to gelling for short periods of time, has a very slow rate of vulcanization and for that reason is unsuitable for most applications, particularly those requiring an air-curing cement.

An object of the present invention is to provide a neoprene cement which will not gel under normal conditions of storage but which has a rapid rate of vulcanization.

Another object of the invention is to provide a neoprene cement which forms a vulcanized bond of great strength between two surfaces than has heretofore been possible by the use of a neoprene cement.

A further object of the invention is to provide a neoprene cement resistant to gelling during storage but capable of producing a stronger vulcanized bond between two surfaces in reduced vulcanization time.

Yet another object of the invention is to provide an improved neoprene cement which contains as an accelerator the reaction product of an amino-alcohol and carbon disulfide.

The amino-alcohol of the invention may be selected from the alkylamino-alcohols such as monoethanolamine, diethanolamine and triethanolamine. Other satisfactory amino-alcohols are monopropanolamine, dipropanolamine and tripropanolamine as well as mixtures of the propanolamines with each other and other amino-alcohols. Also useful are butanolamines such as isobutanolamine and other amino-alcohols such as 2-amino-2-methyl propanol.

The amino-alcohol or mixture of amino-alcohols selected for the novel cement is mixed with carbon disulfide either before or after addition to the cement.

In one manner of preparing a cement of the invention, neoprene is masticated on a two-roll mixing mill, and ingredients such as carbon black, antioxidant, and oils are added with continued mastication until a uniform dispersion of ingredients in the neoprene is obtained. The neoprene compound is removed from the mill and is dissolved by stirring in a suitable solvent, such as toluene, until a cement of a concentration approximating one pound of neoprene compound for each gallon of cement is produced. Other methods of mixing are familiar to those skilled in the art of manufacturing solvent cements and will produce satisfactory results. Therefore, it is not intended to limit the invention to the method set forth above.

Among the known solvents useful for neoprene cements are aromatic solvents such as benzene, toluene, xylene and their homologues; ethylene dichloride, trichloroethylene, and other chlorinated hydrocarbon solvents; ester solvents, such as amyl acetate, butyl formate, butyl acetate, ethyl acetate and ethyl propionate; ketones, such as methyl ethyl ketone, isophorone and the like; mixtures of any of the above solvents with each other or with gasoline or the like; and commercial mixed solvents for neoprene known to the art.

The cements of the invention are tested in the following manner:

OVEN TESTS

A container holding a sample of the cement to be tested is placed in an atmosphere of hot air at 158° F. and the time required for the appearance of a solid gel formation in the cement is recorded.

DEAD WEIGHT TEST

The surfaces of two strips of rubberized fabric 12 x 4¼ inches are cleaned with an aromatic solvent and a margin of at least ¾ of an inch along one long edge of each strip is cemented with the neoprene adhesive to be tested. The adhesive is allowed to dry and a second adhesive coat is applied and also allowed to dry. The two strips of fabric are pressed together to form a ¾ inch overlapping seam which is rolled out with a roller stitcher to produce intimate contacts of the cemented surfaces and to expel air bubbles. The seams thus formed are air-cured at a desired temperature for the length of time of the test. Sample specimens two inches in width are cut at right angles to the seam. The test specimen is placed in an atmosphere of hot air at 140° F. and gripped parallel to the seam with self-aligning grips. A load is applied to the grips normal to the seam at a rate of 30 pounds per minute in an attempt to pull the seam apart. Results are reported in pounds of load and in time in minutes and seconds required for separation of the seam. Apparatus for the test is similar to that shown in Figure 4 of United States Air Force-Navy Aeronautical Specification MIL-C-5539 dated January 9, 1950. This specification requires an air drying adhesive to cure within ten days and to have a minimum strength on dead weight test of 60 lbs. when tested at 140° F.

To carry out the invention, a base stock was mixed on a two-roll rubber mill according to the following formula:

| | Parts of weight of rubber |
|---|---|
| Polychlorobutadiene rubber [1] | 100.00 |
| Carbon black | 3.00 |
| Antioxidant | 2.00 |
| | 105.00 |

[1] Neoprene CG was used but neoprene AC, neoprene GN, neoprene KN, KNR and other types are acceptable.

The mixed stock was dispersed in toluene to make a base cement with a total solids concentration of approximately 10% by weight. To this base cement various amounts of curing ingredients were added and dispersed, and the resulting cements were tested in the oven test and dead weight test, all samples being air-cured at room temperature. The added ingredients and test results are given in Example I. In the examples set out all parts of ingredients are based on 100 parts of neoprene.

To test the characteristics of novel cements using the accelerators of the invention, samples were mixed and tested according to the following example:

The above examples show that a satisfactory cure is obtained in an air-cure cement accelerated with amino-alcohol and carbon disulfide. Some amino-alcohols provide an air-curing cement with a more rapid rate of cure than others, i. e. the cement accelerated with isobutanolamine cures more rapidly than the cement cured with triethanolamine.

Only relatively small proportions of the amino-alcohol and carbon disulfide based upon the neoprene content of the cements of the invention are required. The actual amounts of these ingredients utilized, are in line with the amounts of vulcanization accelerators normally employed in neoprene cements. Excess carbon disulfide is unnecessary in the cement when the reaction product of carbon disulfide and the alkyl amino-alcohols are used. Excess carbon disulfide might be desirable to accelerate the rate of vulcanization in these cements.

The term "chloroprene polymer" is used generically herein to include all commercial neoprenes. The term is used to include homopolymers of chloroprene as well as copolymers of chloroprene with sulfur and/or one or more unsaturated comonomers, including polymerizable ethylene compounds, such as styrene, acrylonitrile, vinylpyridine, vinyl chloride, vinylidene chloride, chlorotrifluoroethylene, and derivatives of these substances as well as other known monomers of the aliphatic and aromatic series of compounds; a conjugated diene, such as butadiene, isoprene, dichlorobutadiene and other

*Example 1*

| | Sample No. | | | |
|---|---|---|---|---|
| | 1 | 2 | 3 | 4 |
| Base Cement | Control 1 gal. | 1 gal | 1 gal | 1 gal. |
| Zinc butyl xanthate | | 5.9 | | |
| Dibenzylamine | 6.16 | | | |
| Carbon disulfide | 14.00 | | | |
| Monoethanolammonium ethanoldithiocarbamate | | 5.92 | 5.92 | 11.95. |
| Dead Wt. Test (48 hrs. cure at 75° F.): | | | (cured 22 hrs. at 75° F.) | |
| Pounds | 20 | 32 | 50 | 58. |
| Time— | | | | |
| Min | 0 | 1 | 1 | 1. |
| Sec | 40 | 4 | 40 | 56. |
| Time to gel 75° F | 24 hrs | No gel, 60 days. | No gel, 60 days. | No gel, 60 days. |

It will be seen that the use of the reaction product of monoethanolamine and carbon disulfide as an accelerator in cement samples 2, 3 and 4 resulted in increased rate of cure and improved gel resistance over the control.

In addition to monoethanolamine, cements containing diethanolamine and triethanolamine are within the scope of the invention as are cements containing other alkyl amino-alcohols as shown by the following example:

known polymerizable dienes; and also polymerizable unconjugated polyenes, including pentadiene-1,4 and the like.

I claim:

1. A quick-curing cement containing a rubbery chloroprene polymer, a solvent for said polymer, and as an accelerator relatively small proportions of the reaction product of carbon disulfide and an alkyl amino-alcohol.

*Example 2*

| | Sample No. | | | | |
|---|---|---|---|---|---|
| | 5 | 6 | 7 | 8 | 9 |
| Base Cement | 1 gal | 1 gal | 1 gal | 1 gal | 1 gal. |
| Carbon disulfide | 22.6 | 22.6 | 22.6 | 22.6 | 22.6. |
| Monoethanolamine | 4.9 | | | | |
| Diethanolamine | | 7.85 | | | |
| Triethanolamine | | | 8.1 | | |
| Isobutanolamine | | | | 6.77 | |
| 2-amino-2-methyl-propanol | | | | | 4.8. |
| Dead Wt. Test (Cured 20 hrs. at 75° F.): | | | | | |
| Pounds | 50 | 22 | 11 | 82 | 46. |
| Time— | | | | | |
| Min | 1 | 0 | 0 | 2 | 1. |
| Sec | 40 | 44 | 23 | 44 | 33. |
| (Cured 10 days at 75° F.): | | | | | |
| Pounds | | 64 | 52 | | |
| Time— | | | | | |
| Min | | 2 | 1 | | |
| Sec | | 14 | 42 | | |
| Days to gel 158° F | 6 | No gel, 10. | No gel, 10. | 3 | 6. |

2. A quick-curing cement according to claim 1 wherein the alkyl amino-alcohol is monoethanolamine.

3. A quick-curing cement according to claim 1 wherein the alkyl amino-alcohol is diethanolamine.

4. A quick-curing cement according to claim 1 wherein the alkyl amino-alcohol is triethanolamine.

5. A quick-curing cement according to claim 1 wherein the alkyl amino-alcohol is isobutanolamine.

6. A quick-curing cement according to claim 1 wherein the alkyl amino-alcohol is 2-amino-2 methyl-propanol.

7. A method of manufacturing a quick-curing rubbery chloroprene cement comprising the steps of dissolving the rubbery chloroprene in a solvent, and adding as an accelerator relatively small proportions of the reaction product of an alkyl amino-alcohol and carbon disulfide.

8. A method of manufacturing a quick-curing rubbery chloroprene cement comprising the steps of dissolving the rubbery chloroprene in a solvent and adding as accelerators relatively small proportions of an alkyl amino-alcohol and carbon disulfide.

9. A quick curing cement containing a rubbery chloroprene polymer, a solvent for said polymer, and as an accelerator the reaction product of an excess of carbon disulfide and not over 8.1% of an alkyl amino-alcohol based on the weight of said polymer present.

10. A quick curing cement according to claim 1 wherein the alkyl amino-alcohol is monoethanolamine.

11. A quick curing cement according to claim 1 wherein the alkyl amino-alcohol is diethanolamine.

12. A quick curing cement according to claim 1 wherein the alkyl amino-alcohol is triethanolamine.

13. A quick curing cement according to claim 1 wherein the alkyl amino-alcohol is isobutanolamine.

14. A quick curing cement according to claim 1 wherein the alkyl amino-alcohol is 2-amino-2 methyl-propanol.

15. A method of manufacturing a quick curing rubbery chloroprene cement comprising the steps of dissolving the rubbery chloroprene in a solvent and adding as accelerators not over 8.1% based on the weight of polymer present of an alkyl amino-alcohol and an excess of carbon disulfide.

References Cited in the file of this patent

UNITED STATES PATENTS

| | | |
|---|---|---|
| 2,024,925 | Hirschkind | Dec. 17, 1935 |
| 2,163,611 | MacDonald | June 27, 1939 |
| 2,340,650 | Dean | Feb. 1, 1944 |
| 2,372,895 | Harman | Apr. 3, 1945 |
| 2,455,911 | Bake | Dec. 14, 1948 |
| 2,514,192 | Tann | July 4, 1950 |
| 2,525,200 | Bergmann | Oct. 10, 1950 |
| 2,649,432 | Little | Aug. 18, 1953 |